US011908997B2

United States Patent
Kyu et al.

(10) Patent No.: US 11,908,997 B2
(45) Date of Patent: Feb. 20, 2024

(54) DEVELOPMENT OF A SUPERCAPACITIVE BATTERY VIA IN-SITU LITHIATION

(71) Applicants: Thein Kyu, Akron, OH (US); Ran Li, Beijing (CN)

(72) Inventors: Thein Kyu, Akron, OH (US); Ran Li, Beijing (CN)

(73) Assignee: THE UNIVERSITY OF AKRON, Akron, OH (US)

( * ) Notice: Subject to any disclaimer, the term of this patent is extended or adjusted under 35 U.S.C. 154(b) by 260 days.

(21) Appl. No.: 17/409,036

(22) Filed: Aug. 23, 2021

(65) Prior Publication Data

US 2022/0131179 A1 Apr. 28, 2022

Related U.S. Application Data

(60) Provisional application No. 63/104,050, filed on Oct. 22, 2020.

(51) Int. Cl.
| | | |
|---|---|---|
| *H01M 10/0565* | (2010.01) | |
| *H01M 10/0525* | (2010.01) | |
| *H01M 4/505* | (2010.01) | |
| *H01M 4/525* | (2010.01) | |
| *H01M 4/58* | (2010.01) | |
| *H01M 4/88* | (2006.01) | |

(52) U.S. Cl.
CPC ....... *H01M 10/0565* (2013.01); *H01M 4/505* (2013.01); *H01M 4/525* (2013.01); *H01M 4/5825* (2013.01); *H01M 10/0525* (2013.01); *H01M 4/881* (2013.01); *H01M 2220/20* (2013.01); *H01M 2300/0082* (2013.01); *H01M 2300/0085* (2013.01)

(58) Field of Classification Search
None
See application file for complete search history.

(56) References Cited

U.S. PATENT DOCUMENTS

2014/0255772 A1* 9/2014 Kyu ................. H01M 10/0565
429/189
2018/0145370 A1* 5/2018 Buisine .................. H01G 11/56

OTHER PUBLICATIONS

Echeverri et al.; "Highly conductive, completely amorphous polymer electrolyte membranes fabricated through photo-polymerization of poly(ethylene glycol diacrylate) in mixtures of solid plasticizer and lithium salt"; Solid State Ionics 254, pp. 92-100 (Year: 2014).*
Fu et al.; "Highly conductive solid polymer electrolyte membranes based on polyethylene glycol-bis-carbamate dimethacrylate networks"; Journal of Power Sources 359, pp. 441-449 (Year: 2017).*
He et al.; "Highly conductive solvent-free polymer electrolyte membrane for lithium-ion batteries: Effect of prepolymer molecular weight", Journal of Membrane Science 498 pp. 208-217 (Year: 2016).*
Kuo et al.; "Solid polymer electrolytes V: microstructure and ionic conductivity of epoxide-crosslinked polyether networks doped with LiClO4", Polymer 44 pp. 2957-2964 (Year: 2003).*
Lee et al.; "Multifunctional polymer electrolyte membrane networks for energy storage via ion-dipole complexation in lithium metal battery", Journal of Energy Storage 64 107138, 10 pages. (Year: 2023).*

* cited by examiner

*Primary Examiner* — Gregg Cantelmo
(74) *Attorney, Agent, or Firm* — RENNER KENNER GREIVE BOBAK TAYLOR & WEBER

(57) ABSTRACT

A solid-state polymer electrolyte membrane and a supercapacitive lithium-ion battery utilizing the solid-state polymer electrolyte membrane. The solid-state polymer electrolyte membrane comprising a mixture of a lithium salt, a plasticizer, and a co-network of a crosslinkable polyether addition and a crosslinkable amine addition. The co-network is crosslinked, and the solid-state polymer electrolyte membrane is conductive on the order of $10^{-3}$ S cm$^{-1}$. The supercapacitive lithium-ion battery utilizing the solid-state polymer electrolyte membrane has an operating range of between about 0.01 and about 4.3 V without short-circuiting while also having a higher capacity relative to conventional liquid electrolyte lithium-ion batteries.

20 Claims, No Drawings

DEVELOPMENT OF A SUPERCAPACITIVE BATTERY VIA IN-SITU LITHIATION

STATEMENT REGARDING FEDERALLY SPONSORED RESEARCH OR DEVELOPMENT

This invention was made with government support under DMR-1502543 awarded by National Science Foundation. The government has certain rights in the invention.

FIELD OF THE INVENTION

The present invention generally relates to the creation of solid-state polymer electrolyte membranes (PEM). Particularly, the present invention relates to the creation of a supercapacitive battery utilizing a solid-state PEM. More particularly, the present invention relates to the creation of a solid-state PEM for use in a supercapacitive battery wherein the solid-state PEM includes a co-network of a crosslinkable polyether addition and a crosslinkable amine addition.

BACKGROUND OF THE INVENTION

For last three decades, lithium-ion batteries have been widely used in portable devices such as computers and cellphones. Currently, they are now also being used to power electric vehicles. With the expansion of the market, making sure that lithium-ion batteries are safe to use becomes more and more vital. According to many reports, liquid electrolyte lithium-ion batteries are easy to catch fire because the organic carbonate solvents used inside are volatile and flammable, meaning a low flash point and poor thermal stability. Therefore, by virtue of non-flammability and chemical stability, a solid polymer electrolyte, which is a kind of solid membrane with alkali metal salt dissolved in a polymer, has been extensively studied for potential applications in lithium-ion batteries. However, in a solid state, lithium-ion transportation is worse than that in the liquid state, resulting in low current drains or low power density in battery performance, which becomes the main obstacle for solid-state battery development.

During the charging cycle, the lithium ions stripped from the lithium metal anode are transported to the electrolyte and anode interface and then travel through the electrolyte toward the cathode. The reverse process occurs during the discharging cycle. Hence, the number of transferable ions is the most important part of ionic conductivity. The development of solid electrolytes for polymer lithium batteries has been a major challenge in the energy storage industry. In present lithium battery technology, organic solvents are customarily used as a means of ionizing the ionic lithium salt and concurrently promoting ion transport through polymeric separator membranes. However, the irreversible reaction at the interface between the solvent electrolytes and the electrodes leads to contamination, which in turn reduces the battery shelf-life. Additionally, the organic solvents are contained in metal containers of various shapes, making such batteries heavy and bulky such that significant space is required for intended applications, for instance, in electric vehicles. Moreover, damaged, or leaky battery containers can present a safety risk.

As a result, several major efforts have been directed to fabrication of non-volatile conductive membranes, notably polymer gel-based electrolytes. The conventional polymer electrolyte utilized poly(ethylene oxide) (PEO) as a matrix, but the room temperature ionic conductivity was orders of magnitude lower than the conventional lithium battery containing organic solvents. Recently, researchers demonstrated the feasibility of producing solvent-free solid electrolyte by doping with succinonitrile (SCN) plastic crystals for lithium-ion transport. They showed that only a small amount of lithium salt (1 mol %) was needed to achieve reasonably high ionic conductivity—on the order of $10^{-4}$ S cm$^{-1}$—despite the fact that SCN itself is a poor ionic conductor. However, the plastic crystal matrix is a waxy substance without sustainable mechanical integrity thereby preventing its full utilization as solid electrolyte.

U.S. Pat. No. 9,548,514 teaches the creation of a PEM made from a combination of a crosslinkable polyether addition, a lithium salt, and a plasticizer. Once such PEM created was made from poly(ethylene glycol)diacrylate (PEGDA) as the crosslinkable polyether addition, lithium bis-trifluoromethane sulfonyl imide (LiTFSI) as the lithium salt, and succinonitrile (SCN) as the plasticizer. The PEGDA/SCN/LiTFSI polymer electrolyte membrane exhibited a high ionic conductivity of $10^{-3}$ S cm$^{-1}$ at room temperatures. However, the PEGDA matrices have limited functionality, i.e., ether oxygen, that form coordination bonding with dissociated lithium ions through which facile lithium-ion transport occurs.

Therefore, there is a need in the art to provide a solid PEM that is multifunctional, and which can undergo a lithiation process to allow for the solid PEM to provide a battery with a wider operating voltage range to allow for said battery to prolong (i.e., about double its discharge time as compared to standard liquid electrolyte lithium-ion batteries.

SUMMARY OF THE INVENTION

An embodiment of the present invention provides a solid-state polymer electrolyte membrane comprising: a mixture of a lithium salt, a plasticizer, and a co-network of a crosslinkable polyether addition and a crosslinkable amine addition, wherein the co-network is crosslinked, and the solid polymer electrolyte membrane is conductive on the order of $10^{-3}$ S cm$^{-1}$.

Another embodiment of the present invention provides a solid-state polymer electrolyte membrane as in any embodiment above, wherein the lithium salt is lithium bis-trifluoromethanesulfonylimide (LiTFSI), lithium bis-perfluoroethylsulfonylimide, lithium tetrafluoroborate, lithium perchlorate or mixtures thereof.

Another embodiment of the present invention provides a solid-state polymer electrolyte membrane as in any embodiment above, wherein the plasticizer is succinonitrile (SCN), glutaronitrile (GCN), adiponitrile, camphor, dialkylsebacate, alkyl stearate, or mixtures thereof.

Another embodiment of the present invention provides a solid-state polymer electrolyte membrane as in any embodiment above, wherein the crosslinkable polyether addition is poly(ethylene glycol) diglycidyl ether (PEGDGE), poly(ethylene glycol)diacrylate (PEGDA), poly(ethylene glycol) dimethacrylate (PEGDMA), poly(propylene glycol) diacrylate (PPGDA), and poly(propylene glycol) dimethacrylate (PPGDMA), copolymers thereof, and mixtures thereof.

Another embodiment of the present invention provides a solid-state polymer electrolyte membrane as in any embodiment above, wherein the crosslinkable amine addition is a polyether amine and wherein the polyether amine is either a polyether diamine or a polyether triamine.

Another embodiment of the present invention provides a solid-state polymer electrolyte membrane as in any embodiment above, further comprising a crosslinking agent, wherein the crosslinking agent is trimethylolpropane triacrylate (TMPTA), pentaerythritol triacrylate, trimethylolpropane ethoxylate triacrylate, trimethylolpropane propoxylate triacrylate, glycidyl methacrylate (GMA), or mixtures thereof.

An embodiment of the present invention provides a method of creating a lithium-ion battery comprising the steps of: providing an anode; providing a cathode, preparing a solid-state electrolyte polymer membrane comprising the steps of: mixing a lithium salt, a plasticizer, and a co-network of a crosslinkable polyether addition and a crosslinkable amine addition; and crosslinking the mixture to form said solid-state electrolyte polymer membrane; and combining the anode, the cathode, and the solid-state electrolyte polymer membrane to create a lithium-ion battery.

Another embodiment of the present invention provides a method of creating a lithium-ion battery as in any method embodiment above, wherein the anode is lithium metal, graphite, silicon, tin, germanium, or combinations thereof.

Another embodiment of the present invention provides a method of creating a lithium-ion battery as in any method embodiment above, wherein the cathode is Lithium Iron Phosphate (LFP), Lithium Nickel Cobalt Manganese Oxide (NMC), Lithium Nickel Manganese Spinel (LMN) Lithium Nickel Cobalt Aluminum Oxide (NCA), Lithium Cobalt Oxide (LCO), Lithium Manganese Oxide (LMO), or combinations thereof.

Another embodiment of the present invention provides a method of creating a lithium-ion battery as in any method embodiment above, wherein the lithium salt is lithium bis-trifluoromethanesulfonylimide (LiTFSI), lithium bis-perfluoroethylsulfonylimide, lithium tetrafluoroborate, lithium perchlorate or mixtures thereof.

Another embodiment of the present invention provides a method of creating a lithium-ion battery as in any method embodiment above, wherein the plasticizer is succinonitrile (SCN), glutaronitrile (GCN), adiponitrile, camphor, dialkylsebacate, alkyl stearate, or mixtures thereof.

Another embodiment of the present invention provides a method of creating a lithium-ion battery as in any method embodiment above, wherein the crosslinkable polyether addition is poly(ethylene glycol) diglycidyl ether (PEGDGE), poly(ethylene glycol)diacrylate (PEGDA), poly(ethylene glycol)dimethacrylate (PEGDMA), poly(propylene glycol) diacrylate (PPGDA), and poly(propylene glycol) dimethacrylate (PPGDMA) or mixtures thereof.

Another embodiment of the present invention provides a method of creating a lithium-ion battery as in any method embodiment above, wherein the crosslinkable amine addition is a polyether amine and wherein the polyether amine is either a polyether diamine or a polyether triamine.

Another embodiment of the present invention provides a method of creating a lithium-ion battery as in any method embodiment above, wherein the step of mixing further includes mixing in a crosslinking agent, wherein the crosslinking agent is trimethylolpropane triacrylate (TMPTA), pentaerythritol triacrylate, trimethylolpropane ethoxylate triacrylate, trimethylolpropane propoxylate triacrylate, glycidyl methacrylate (GMA), or mixtures thereof.

An embodiment of the present invention provides a method of creating a supercapacitive lithium-ion battery comprising the steps of: providing an anode; providing a cathode, preparing a solid-state electrolyte polymer membrane comprising the steps of: mixing a lithium salt, a plasticizer, and a co-network of a crosslinkable polyether addition and a crosslinkable amine addition; and crosslinking the mixture to form said solid-state electrolyte polymer membrane; combining the anode, the cathode, and the solid-state electrolyte polymer membrane to create a lithium-ion battery; and lithiating the lithium-ion battery by deep discharging the lithium-ion battery, wherein deep discharging includes lowering the voltage to −0.5 V and then increasing the voltage to 0.5 V during the first cycle of the lithium-ion battery so as to form a supercapacitive lithium-ion battery, wherein the supercapacitive lithium-ion battery has an operating range of between about 0.01 and about 4.3 V without short-circuiting.

Another embodiment of the present invention provides a method as in the method above, wherein the provided anode is a lithium metal, the provided cathode is Lithium Iron Phosphate (LFP), the lithium salt is lithium bis-trifluoromethanesulfonylimide (LiTFSI), the plasticizer is succinonitrile (SCN), the crosslinkable polyether addition is poly(ethylene glycol) diglycidyl ether (PEGDGE), and the crosslinkable amine addition is a polyether amine and wherein the polyether amine is either a polyether diamine or a polyether triamine.

DETAILED DESCRIPTION OF ILLUSTRATIVE EMBODIMENTS

The present invention provides multifunctional solid-state polymer electrolyte membranes PEMs for electrochemical devices. The solid-state PEMs are formed from mixtures of a lithium salt, a plasticizer, and a co-network of a crosslinkable polyether addition and a crosslinkable amine addition. In addition, while the solid-state PEM as described above is highly ion-conductive, reaching the level of superionic conductors (greater than $10^{-3}$ S cm$^{-1}$ at battery operating temperatures of between 40 and 45° C.), the present invention also provides a process of lithiating the solid-state PEM as described above such that the lithiated solid-state PEM can be used in electrochemical devices over a wider voltage range of between −0.5 and 4.3 V as compared to a conventional liquid electrolyte lithium-ion battery of between 2.5 and 4.3 V.

In some embodiments, the lithium salt is selected from lithium bis-trifluoromethanesulfonylimide (LiTFSI), lithium bis-perfluoroethylsulfonylimide, lithium tetrafluoroborate, and lithium perchlorate and mixtures thereof.

In some embodiments, the plasticizer is selected from the group consisting of glutaronitrile (GCN), succinonitrile (SCN), adiponitrile, camphor, dialkylsebacate, alkyl stearate, and mixtures thereof.

In some embodiments the crosslinkable polyether addition is selected from poly(ethylene glycol) diglycidyl ether (PEGDGE), poly(ethylene glycol)diacrylate (PEGDA), poly(ethylene glycol)dimethacrylate (PEGDMA), poly(propylene glycol) diacrylate (PPGDA), and poly(propylene glycol) dimethacrylate (PPGDMA), copolymers thereof, and mixtures thereof.

The crosslinkable polyether addition may further be chosen based upon its molecular weight. In some embodiments, the crosslinkable polyether addition has a molecular weight of from 200 or more to 12000 or less. In other embodiments, the crosslinkable polyether addition has a molecular weight of from 400 or more to 8000 or less, in other embodiments, from 700 or more to 6000 or less, and, in yet other embodiments, from 1000 or more to 6000 or less. In some embodiments, the crosslinkable polyether addition has a molecular weight equal to or greater than 200, in other embodiments, equal to or greater than 400, in other embodiments, equal to or greater than 700, and in yet other embodiments, equal to or greater than 1000, in other embodiments, equal to or greater than 2000, in other embodiments, equal to or greater than 3000. In some embodiments, the crosslinkable polyether addition has a molecular weight equal to or less than 12000, in other embodiments, equal to or less than 10000, in other embodiments, equal to or less than 8000, and, in yet other embodiments, equal to or less than 6000.

In some embodiments, the crosslinkable amine addition is selected from polyether amines including polyether diamines such as Jeffamine® D400 and polyether triamines such as Jeffamine® D403.

Because the degree of crosslinking will affect the mechanical properties of the resultant solid-state PEM, in some embodiments, the co-network of a crosslinkable polyether addition and a crosslinkable amine addition will include a small molecule serving as a crosslinking agent to increase the crosslinking density and thus enhance mechanical properties. The crosslinking agent is selected to be multifunctional, meaning each unit of the crosslinking agent will have multiple crosslinking sites. In some embodiments, the crosslinking agent is selected from multifunctional small molecules including trimethylolpropane triacrylate (TMPTA), pentaerythritol triacrylate, trimethylolpropane ethoxylate triacrylate, trimethylolpropane propoxylate triacrylate, glycidyl methacrylate (GMA) and mixtures thereof. The crosslinking agent, as a multifunctional small molecule, will serve as a hub for the extension of polymer chain, thus increasing crosslinking density.

In one or more embodiments of the present invention, the crosslinkable polyether addition will take up between about 50 and about 90 percent by weight of the whole co-network, in other embodiments between about 60 and about 80 percent by weight of the whole co-network, and in yet other embodiments between about 65 and about 75 percent by weight of the whole co-network.

In one or more embodiments of the present invention, the crosslinkable amine addition will take up between about 10 and about 50 percent by weight of the whole co-network, in other embodiments between about 20 and 40 percent by weight of the whole co-network, and in yet other embodiments between about 25 and 35 percent by weight of the whole co-network.

In one or more embodiments of the present invention, the co-network of the crosslinkable polyether addition and the crosslinkable amine addition will take up between about 10 and about 30 percent by weight of the solid-state PEM, in other embodiments between about 15 and about 25 percent by weight of the solid-state PEM, and in yet other embodiment between about 18 and about 22 percent by weight of the solid-state PEM.

In one or more embodiments of the present invention, the plasticizer will take up between about 35 and about 45 percent by weight of the solid-state PEM, in other embodiments between about 37.5 and about 42.5 percent by weight of the solid-state PEM, and in yet other embodiments between about 39 and about 41 percent by weight of the solid-state PEM In one or more embodiments of the present invention, the lithium salt will take up between about 35 and about 45 percent by weight of the solid-state PEM, in other embodiments between about 37.5 and about 42.5 percent by weight of the soli solid-state d PEM, and in yet other embodiments between about 39 and about 41 percent by weight of the solid-state PEM.

In one or more embodiments of the present invention, the solid-state PEM is created with a weight ratio of the co-network of the crosslinkable polyether addition and the crosslinkable amine addition/plasticizer/lithium salt of 20/40/40, 30/35/35, or 30/40/30.

The ionic conductivity of a solid-state PEM comprising 20/40/40 PEGDGE (70%)/Jeffamine® D400 (30%) co-network/SCN/LiTFSI reached a comparable ionic conductivity level to a PEM comprising 20/40/40 PEGDA/SCN/LiTFSI ratio. The ionic conductivity was on the order $10^{-3}$ S cm-1 at the battery operating temperatures of 40~45° C., which is on the level of being considered a superionic conductor. Cyclic voltammograms of a battery utilizing the solid-state PEM of the present invention, before undergoing any lithiation procedures, showed an oxidation peak at 3.7 V and a reduction peak at 3.3 V for 5 cycles showing the overlapping CV curves suggestive of electrochemical stability in the range of a lithium iron phosphate (LFP) cathode. The variation of voltage versus specific capacity of the galvanometric charging and discharging curves revealed the stable character with the specific capacitor value of 150~160 mAh/g for 50 cycles tested at a current rate of 0.1 C, which is close to the theoretical value (170 mAh/g) of an LFP cathode. Note that the notation of 1 C means the cycling rate of 1 cycle per hour. The discharge capacity retention was over 95% for 50 cycles tested, while retaining almost 100% of its Columbic efficiency. Moreover, the discharge capacity for various current rates from 0.1 C to 2 C exhibited the excellent recovery when reverted back from 2 C to 0.1 C. These features are very promising and highly desirable for a solid-state polymer lithium-ion battery.

As discussed above, the present invention also provides a process of lithiating a battery utilizing the solid-state PEM as described above such that the battery can be used in electrochemical devices over a wider voltage range of −0.5 to about 4.3 V as compared to a conventional liquid electrolyte lithium-ion battery of between 2.7 and 4.3 V. The process creates what the present inventors are calling a "supercapacitive battery". The supercapacitive battery, which utilizes the solid-state PEM to store extra lithium ions, has a wider operating range of 0.01 to about 4.3 V, as compared to a conventional liquid electrolyte lithium-ion battery of between 2.5 and 4.3 V. Furthermore, the supercapacitive battery has a larger capacity comparable to or higher than the theoretical capacity of a corresponding LFP cathode. Although the actual voltage range obtainable by the supercapacitive battery of the present invention is −0.5 to about 4.3 V, the choice of the lowest operating potential of 0.01 V is used as a precautionary measure. The supercapacitive battery of the present invention can therefore obtain a discharging time that is at least twice as long as compared to a conventional liquid electrolyte lithium-ion battery. Therefore, if used in an electric vehicle, the supercapacitive battery of the present invention can cover twice the travel distance before needing re-charged.

The main idea of supercapacitive battery is based on the preloading of excess lithium ions in the multifunctional polymer electrolyte networks through a lithiation process, which can be accomplished via well-known electrochemical and/or chemical approaches. It is well documented that lithium ions are transported through the ion-dipole complexation sites between the mobile lithium cations and ether oxygen of the polymer matrix such as a polyether network. When additional functionalities such as ether, ester, amine, urethane, or nitrile moieties are imparted in the matrix polymer, lithium ions can form coordination bonds with some of the aforementioned functional groups within the polymer matrices (or networks), thereby rendering extra storage capacity. It can be anticipated that the internal cell resistance could increase since entrapped lithium ions are no longer participating in the overall lithium-ion transport.

However, in the present case, there are an excess number of lithium ions available due to the lithiation process that takes place before the battery is created, therefore there will be plenty of free, mobile lithium ions still available, and thus the lithium-ion transport remains very high. This lithiation process in principle permits facile ion conduction as well as extra Li+ storage capacity inside the multifunctional solid-state PEM network, which is hard to come by in a conventional liquid electrolyte system. If a deep discharging process were performed with a conventional liquid electrolyte lithium-ion battery, the organic liquid electrolyte will boil and leak from the battery cells resulting in catastrophic battery failure or catching fire. The population of anions remained unchanged before and after the lithiation process, hence the ion transport will be dominated by the excess lithium cations. If a chemical approach is utilized for the lithiation process, the dissociated anions from active materials such as halides or carbonates, can be eliminated or chemically attached onto the polymer matrix/binder or carbon nanotube (CNT) electrode surface by heating at elevated temperatures above 150° C. during the CNT electrode fabrication. The ion transport is therefore dominated by excess lithium ions from the lithiation process, which is reminiscent of single ion transports or at least the transference number is expected to rise and hence the battery performance will also rise.

As discussed above, in most instances when a battery includes a liquid electrolyte, deep discharging can be detrimental to the battery. Deep discharging is defined as using a lithium metal as a negative electrode (often called anode) and taking it to below zero voltage (e.g., −0.5 V which corresponds to the reduction peak of the redox reaction at the lithium metal electrode, often referred to as lithium deposition (i.e., from −0.5V to zero volt)). This process is typically detrimental to a battery because during the reduction reaction the lithium ions are converted to Li metal and subsequently deposited on the surface of the lithium metal electrode (which is analogous to lithium crystal nucleation) while forming lithium dendrites during crystal growth. The lithium dendrites continue to grow over time during repeated cycles which eventually results in the battery short-circuiting and catching fire due to the low boiling points of most organic liquid electrolytes utilized. The organic liquid electrolytes are volatile and will eventually boil and leak, which becomes the cause of most batteries exploding and catching fire.

However, since the present invention forms a solid-state polymer electrolyte, there is no formation of any lithium dendrites. Even if it some lithium dendrites form, they cannot penetrate through the solid-state polymer electrolyte membrane. Because there is minimal dendrite formation, if any, and if any do form, they have no ability to penetrate the solid-state polymer electrolyte membrane, no short circuiting will occur, which means that no fires will be started. A lithium battery utilizing the solid-state PEM's of the present invention will be lithiated in-situ during the batteries first cycle upon lowering the voltage to −0.5 V (i.e., lithium deposition) and lithium ions will be stripped from the lithium metal anode (i.e., lithium stripping) when the voltage reaches +0.5 during battery operation. From the second cycle onward, the lithium battery utilizing the solid-state PEM's of the present invention can be operated in the customary range from 2.5 to 4.2 V (i.e., cathode range) or within 0.01-4.2 V (i.e., PEM+ cathode voltage range). The reason for limiting the voltage from 0.01 V to 4.2 V is to ensure that no lithium deposition (it can occur if the voltage falls below zero volt) occurs during the battery operation to prevent any dendrite formation. The in-situ lithium process requires no extra steps for pre-loading lithium ions by chemical or electrochemical or other means.

To confirm the aforementioned idea, cyclic voltammetry experiments were performed on a Li metal anode/PEM (PEGDGE-co-Jeffamine® (16:4)/SCN(40)/LiTFSI(40))/lithium iron phosphate (LFP) cathode battery for 2 to 4 cycles as a function of scanning rates. It was observed that the current density increased with increasing scanning rate which is comparable to those of electric double layer capacitor (EDLC) at comparable scanning rates. Next, CV scans of the full battery range (i.e., −0.5~4.3 V) were taken, along with the intermediate voltage range of the solid-state PEM network (0.5~3.0 V), and the LFP cathode range. The pronounced redox reaction peaks of the Li metal anode, of the solid-state PEM, and of LFP cathode were observed at the corresponding voltage ranges of (−0.5~0.5 V), (0.5~2.7 V), and (2.7~4.3 V), respectively. The current peak magnitude or area changes were observed with the LFP cathode being the largest, followed by solid-state PEM, and then by Li anode.

The larger the current peak magnitude or the area under the reduction peaks, the higher the discharging power. When the cyclic voltammetry scan was acquired exclusively in the voltage range of the solid-state PEM from 0.5 to 2.7 V, the current density was small, about 0.1 mA/cm2, which is considerably smaller than that obtained in the potential range of the LFP cathode. This observation was not surprising in view of the fact that no lithium stripping/depositing at the lithium metal anode or LFP cathode is involved in the voltage range of the lithiated solid-state PEM. Nevertheless, the sizable redox reaction peaks corresponding to the lithiated solid-state PEMs were clearly discernible. More importantly, the cyclic voltammetry confirmed that the ion storage capability of the lithiated solid-state PEM.

Generally speaking, the lithium cation in the multifunctional solid-state PEM can form coordination bonding with primary, secondary, or tertiary amine nucleophiles and thus its transport can be hampered. On the other hand, the temporary trapping Li ions inside the multifunctional matrix can enhance the storage capacity. The ionic conductivity as well as the ion storage capacity can be enhanced by fully lithiating the solid-state PEM before placement in the battery since excess lithium ions (not involved in the ion-dipole complexation sites) will remain mobile, which can then move freely through the lithium ion-dipole complexed sites toward the cathode and vice versa to anode during charging and discharging, respectively. Moreover, multiple hydrogen bonding sites between the crosslinkable polyether addition and crosslinkable amine addition is anticipated to afford self-healing to alleviate any cracking of the electrode.

In another embodiment of the present invention, the amount of the plasticizer used to create the solid-state PEM's of the present inventions can be reduced by introducing carbamate groups as side chain plasticizers. In one embodiment of the present invention, the carbamate groups are derived from the group consisting of ethylene carbamates (EC), urethanes, or ureas. Because there are numerous primary amine groups present with the crosslinkable amine addition, some of them can be utilized to attach the carbamate groups as side chain plasticizers. Given the numerous amine functionalities crosslinkable amine addition, cyclic ethylene carbamate may be reacted with primary amines via ring opening polymerization to attach a carbamate moiety as a plasticizing side chain to the co-network of the crosslinkable polyether addition and the crosslinkable amine addition. The carbamate side branches can be controlled by varying the concentration of the carbamate groups, which render improved thermal stability and conductivity via enhanced chain mobility. The carbamate side branches can act like ionizers as well as plasticizers, which can also withstand high temperatures of about 120° C. It can be anticipated that the use of the high-ionic conductive and non-flammable solid composite electrolyte with a surface functionalized CNT anode or CNT/carbon black composite anode will improve high temperature performance and produce a non-flammable all solid-state-state battery with a capacity retention rate of greater than 90% over 50 cycles.

The solid-state PEM's of the present invention, even prior to undergoing a lithiation process, are highly ion-conductive reaching the level of superionic conductors (>$10^{-3}$ S/cm at battery operating temperatures of between 40 and 45° C.) afforded by facile ion transport via ion-dipole complexation sites between a lithium cation with ether oxygen and/or with amine nucleophiles, and mechanical support rendered by covalently bonded networks with tunable network arm-architecture, rigidity, and fire safety attributes. It should be emphasized that many of the crosslinkable amine additions useable in the present invention, such as Jeffamine® D400 and Jeffamine® D403 are basic ingredients of adhesive and coating formulations, and also commercially available at low costs, therefore suitable for use as an electrode binder in lieu of the conventional polyvinylidene fluoride or carboxyl methyl cellulose binders.

Once undergoing the lithiation process, the lithiated solid-state PEM's of the present invention exhibit a large current response (about 0.2 mA/cm$^2$ at a scan rate of 1 mV/s) due to the excess lithium ions via the lithiation process, which enhances the current density peak to be comparable to that of an electric double layer capacitor (EDLC) (i.e., about 0.25 mA/cm$^2$ at 40 mV/s). Storage capacity enhancement occurs within the lithiated solid-state PEM's of the present invention matrix as well as at the solid-state PEM/electrode interface, commonly known as the solid electrolyte interface (SEI) layer in a liquid electrolyte system. Hence, the lithiated solid-state PEM film may be viewed as an electrochemically stable SEI layer having a controllable thickness (between 0.5 and 1 mm), network architecture, functionality, and the capabilities to store extra lithium cations.

Of particular importance is that the fully lithiated solid-state PEM's of the present invention exhibit capacity enhancement during 5 cycles (from −0.5 to 4.2 V) at a rate of 0.1 C, reaching the theoretical value of the lithium iron phosphate (LFP) cathode (i.e., 170 mAh/g), suggestive of the saturation of the lithium ions inside the LFP cathode. More importantly, the lithiated solid-state PEM networks are electrochemically stable over 5 V, hence when placed within a solid-state lithium metal battery, the battery can be operated over a wider voltage range of 0.5 to about 4.3 V (i.e., only limited by the cathode stability) relative to the narrow potential range (0 to about 1 V) of a supercapacitor. Hence, the observed cyclic voltammetry (CV) peak covers a significantly wider area, i.e., a higher energy storage capacity relative to a conventional liquid electrolyte-based lithium-ion battery. If the same lithiation protocol undertaken on the solid-state PEM's of the present invention were applied to a conventional liquid electrolyte lithium-ion battery, the organic electrolytes would boil and eventually leak, thereby damaging the battery with the possibility of battery combustion and fire hazard.

In light of the foregoing, it should be appreciated that the present invention significantly advances the art by providing a solid-state polymer electrolyte membrane that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

Polymer Electrolyte Membrane Assembly

To obtain the best ionic conductivity, strength, and elongation, the optimal composition of 20/40/40 polymer precursor/SCN/LiTFSI was chosen based on a ternary phase diagram. The chemical names, structures, specifications, and producers of the materials utilized in the solid-state PEM fabrication are shown in Table 1 below.

TABLE 1

| Chemical name and abbreviation | Chemical structure | Specifications | Company |
| --- | --- | --- | --- |
| poly(ethylene glycol) diglycidyl ether (PEGDGE) | | Mn = 500 | Sigma Aldrich Huntsman |
| Jeffamine ® D400 | | Mn = 430 | Huntsman |
| lithium bis(trifluoromethane) sulfonimide (LiTFSI) | | Purity: 99.95% | Sigma-Aldrich |
| succinonitrile (SCN) | | Purity: 99% | Sigma-Aldrich |

When preparing the PEGDGE/Jeffamine®-based PEM, various weight ratios of PEGDGE and Jeffamine® D400 (80/20, 75/25, and 70/30) were thoroughly mixed in a 20 mL vial to prepare the polymer matrix. Equal parts of the LiTFSI salt and the SCN plasticizer were melt-mixed in advance at 65° C. It is worth noting that the mixing procedure needs to be performed in an argon gas filled glove box or dry room because the lithium salt is very sensitive to the moisture. After thoroughly mixing the polymer matrix precursor, lithium salt and plasticizer in a 20/40/40 weight ratio, thermal initiation was triggered to cure the mixture under the continuous argon flow. After curing, a completely transparent and amorphous polymer film was formed, which is hereafter termed as a solid-state polymer electrolyte. The thermal initiation included subjecting the mixture to a heat treatment at 90° C. for two hours. The thermal initiation triggered the reaction between the amine-functional group and the epoxide ring to afford Battery Fabrication The chemical names, structures, specifications, and producers of the materials utilized in the battery fabrication are shown in Table 2 below.

TABLE 2

| Chemical name and abbreviation | Chemical structure | Specifications | Company |
|---|---|---|---|
| Lithium iron Phosphate (LiFePO$_4$) (LFP) | $Fe^{2+}$ $Li^+$ phosphate structure | Purity: 99.95% | Sigma-Aldrich |
| Carbon black (CB) | C | TIMCAL Graphite & Carbon Super P ® | MTI Corp. |
| poly(vinylidene fluoride) (PVDF) | (F, F repeat unit) | Mw = 180,000 | Sigma-Aldrich |
| 1-Methyl-2-pyrrolidinone (NMP) | (pyrrolidinone structure with N-CH$_3$) | anhydrous, Purity: 99.5% | Sigma-Aldrich |
| Lithium foil | Li | Thickness: 0.75 mm, Purity: 99.9% | Alfa Aesar |

LFP is the active material used in the cathode which serves as a working electrode in the half cells. In other embodiments, the cathode could be selected from Lithium Nickel Cobalt Manganese Oxide (NMC), Lithium Nickel Manganese Spinel (LMN) Lithium Nickel Cobalt Aluminum Oxide (NCA), Lithium Cobalt Oxide (LCO), Lithium Manganese Oxide (LMO), or combinations thereof. It was vacuumed dried at 120° C. for twelve hours prior to use. Carbon blacks were utilized as conductivity enhancers and PVDF was used as a binder in the electrode slurry dissolved in the NMP solvent. For the anode, lithium foil was used as the counter and reference electrode. In other embodiments, the anode could be selected from other lithium metal materials, graphite, silicon, tin, germanium, or combinations thereof.

The cathode for the half call was prepared by mixing the active materials (LiFePO$_4$), carbon black, and PVDF(F-lep60) polymer binder in 4-5 ml NMP solvent at a weight ratio of 8:1:1 in a 20 ml glass vial. Then the slurry was rapidly and vigorously mixed by a Thinky Mixer. After mixing thoroughly, the slurry mixture was spread onto current collectors, i.e., aluminum foil (15 µm thick, ≥99.3% purity), and then the as-coated electrodes were further dried in oven at 150° C. in a vacuum for twenty-four hours. The thickness of active material in the cathode was around 100 mm. After totally dried, the electrode was rolled by a calendaring machine to improve interface contact.

The coin cell batteries were then assembled utilizing a cap on the bottom, then the cathode, then the PEGDE/Jeffamine®-based PEM, then a lithium anode, then a stainless-steel plate, then a spring, and then the cell is closed with a cap on the top. The batteries were prepared according to the CR2032 specification, which means that the diameter of the cell is 20 mm and the height of the battery assembled is 3.2 mm. After being assembled, the coin cells were sealed by compressing with a crimping machine. The whole process of assembling was carried out in an argon gas-filled glove box to keep moisture and oxygen away from the lithium foil.

Experimental Results

Thermogravimetric Analysis (TGA) was utilized to test the thermal stability of the newly developed solid-state PEM's of the present invention. The thermograms showed that the solid-state PEMs experienced two steps of weight loss during the temperature rise from 0° C. to 700° C., representing the decomposition of the SCN plasticizer and the PEGDGE/Jeffamine® co-network, respectively. Actually, the decomposition temperatures of the co-network and LiTFSI salt are approximately same, which explains the reason that the curve only dropped dramatically twice with three components in the solid-state PEMs at such a high temperature window. According to the TGA tests, the optimum temperature for curing the solid-state PEM's of the present invention is estimated to be up to 120° C.

Differential Scanning calorimetry (DSC) was utilized to determine the thermal properties such as the glass transition temperature ($T_g$) and the melting point™ of the newly developed solid-state PEM's of the present invention. DSC experiments were performed on the 70/30 network composition as an example over a temperature range of 0° C. to 300° C. at a rate of 20° C./min. An exothermal peak was observed indicating the total curing process and with the help of an auxiliary line, the starting point of curing was considered as 92.7° C. However, the error was relatively large due to artificial drawing. DSC tests at specific temperature were carried out for confirming the optimal curing temperature. A variation of isothermal DSC thermograms as a function of temperatures were shown. It is worth noting that at 80° C., a red line showed that there is almost no exothermal peak, which means the curing process hardly happened it was even worse at 60° C. It appeared that the curing reaction takes place at 90° C., 100° C. and 110° C. The exothermal peak at 90° C. was the most obvious one. Consequently, 90° C. was taken as the optimal temperature for curing the PEGDGE and Jeffamine® co-network.

The reaction between the PEGDGE and Jeffamine® occurred during mixing upon heating at about 90° C. to afford the corresponding co-network product. Amino groups are electron-donating groups, giving rise to the network products selectively formed by nucleophilic attack of the amine moiety in Jeffamine® D400 to the $C_β$ atom of the epoxide ring. It is interesting to know that after the first epoxy group in PEGDGE reacted with an amine, the reactivity of the second epoxy group was very low compared with the first while the secondary aliphatic amines are far less active than primary amines. Therefore, excess epoxide rings need to be added to form the co-network system. If the epoxy groups are not enough, the membrane will not be fully cured to become a solid network and theoretically, the more secondary aliphatic amines react, the stronger the network system will be, which also can be witnessed in the TGA tests of the pure matrix, e.g., the ratio of 80/20 has a relatively better resistance to high temperature.

Plenty of covalent bonding, hydrogen bonding and ion dipoles are scattered in the co-network structure. Covalent bonding is good for mechanical support which can be witnessed in Dynamic Mechanical Analysis (DMA) tests and ion-dipole complexation bonding is for lithium-ion transfer and hydrogen bonding is good for some physical properties of the solid-state PEM, such as self-healing and mechanical properties. What's more, there are many dangling chains in the network due to the excess of PEGDGE which not only lowers the glass transition temperatures, but also contributes to high ionic conductivity, making the co-network product as a good candidate for a solid-state electrolyte.

A graph of ionic conductivity versus reciprocal temperature at various composition ratios of PEGDGE and Jeffamine® D400 was created (70/30, 75/25, and 80/20). From this FIGURE, it was noticed that ionic conductivity increases with ascending temperature and this trend continues to hold with increasing PEGDGE concentration resulting in greater rate of ion movement. Concurrently, it was noted that the highest conductivity values were found at the ratio of 70/30, achieving the superionic conductor level of $0.7*10^{-3}$ S cm$^{-1}$ at room temperature. Consequently, the ratio of 70/30 was used for the following electrochemical tests in order to evaluate better battery performances.

To further illustrate the PEGDGE/Jeffamine®-based PEM to be a suitable candidate for a solid-state electrolyte, the transference number of lithium ion at room temperature was measured based on the potentiostatic polarization method. The transference number was determined to be 0.568, which is considerably higher than compared to a corresponding liquid electrolyte, which has a transference number of between about 0.2 to 0.35.

The electrochemical stability of PEGDGE/Jeffamine®-based PEM was evaluated by means of linear sweep voltammetry and cyclic voltammetry. The stainless-steel plate was utilized as the working electrode while lithium metal foil was utilized as the counter and reference electrode in a coin cell containing polymer electrolyte (PEGDGE/Jeffamine®)/SCN/LiTFSI 20/40/40. Linear sweep and cyclic voltammetry tests were carried out from 0.01V to 5V and −0.5V to 5V versus Li/Li$^+$ at a scanning rate of 1 mV/s respectively. Both experiments exhibited a good electrochemical stability up to about 4.3V, indicating an electrochemical stability window of the solid-state PEM from 0.5 to 4.3V. The wide voltage window proved that the present solid-state PEM may be regarded as a potential solid-state electrolyte for the LiFePO$_4$ cathode (2.5-4.2V). What's more, the results of these tests indicated that the redox reaction or the life of the battery could last for a long time.

Cyclic voltammograms and Electrochemical Impedance Spectroscopy (EIS) of a PEGDGE/Jeffamine®-based PEM half-cell by assembling LFP as the working electrode and Lithium metal foil as the counter as well as reference electrode were taken and analyzed. The tests were carried out in the potential range from 2.5V to 4.2V (vs. Li/Li+) at a scan rate of 0.3 mV/s. The oxidation and reduction peaks were located at 3.75V and 3.2V respectively, corresponding to the redox reaction in cathode versus Li/Li$^+$ and the two peaks are almost comparable which implies the oxidation and reduction reaction are close to each other, suggestive of good reversibility with little or no loss of Li ions during the cycling. Note that chemical reversibility is used to analyze whether the analyte is stable upon reduction and can subsequently be re-oxidized. Furthermore, the size and shape of each cycle were almost comparable, indicating a good reversibility of the electrochemical reactions within the voltage range applied. Besides, the difference between the anodic peak and cathodic peak potential is called peak-to-peak separation ($\Delta E_p$), suggestive of the barrier to electron transfer inside the battery. In the present case, the peak-to-peak separation was relatively small and remained very stable for the four cycles tested, indicating that there is a low loss of charge transfer. The slight shift shown indicated a minor increase in resistance implying a small irreversible reaction occurring at the electrode surface.

A graph of the discharge capacity (mAh/g) versus the number of cycles for the PEGDGE/Jeffamine®-based PEM against the LiFePO$_4$ anode at various current rates was graphed. At C/10 (C standing for the number of charge/discharge cycles to be completed in an hour, carried out at room temperature), the discharge capacity was observed to be about 146 mAh/g while at C/5 the discharge capacity was observed to be about 132 mAh/g. At C/2 and 2C, the discharge capacities were observed to be about 113 mAh/g and 90 mAh/g, respectively. It is worth noting that the current density was reverted to C/10 after varying different rates, and the initial capacity of 146 mA h/g was recovered, indicating the compatibility between the solid-state PEM of the present invention and the cathode while also suggesting an excellent electrochemical stability at up to 2 C of this half-cell configuration.

To further evaluate the electrochemical performance of the lithium-ion batteries of the present invention, a lithium-ion half-cell was fabricated with the PEGDGE/Jeffamine®-based PEM, and the newly prepared half-cell was cycled at a current density of C/10 with the potential range of 2.5V to 4.2V. The plateau behavior seen indicates that the electrochemical potential of the main material is independent of the occupancy ratio of the ions in the material. Furthermore, the charging and discharging voltage plateaus observed about at the potentials of 3.47V and 3.37V respectively, correspond to the redox reaction versus Li/Li$^+$. The specific discharge capacity was also kept constant at about 150 mAh/g, indicating an excellent capacity retention of about 96.6% at 50 cycles tested, while the corresponding Coulombic efficiency remained invariant at about 100%, which implies that the PEGDGE/Jeffamine®-based PEM is compatible with a LiFePO$_4$ cathode. The first point of Coulombic efficiency was low at about 85%, which is mainly caused by the structural change of the cathode material after the first discharge. The positions where lithium ions can be inserted are reduced so that the lithium ions cannot be fully inserted back to the positive electrode during the first discharge, thus causing the low first Coulombic efficiency. The half-cell test revealed excellent capacity retention at a specific current density as well as at various current densities in conjunction with the highly ionic conductivity, which makes the present solid-state PEM a good candidate for high power density batteries.

What is claimed is:
1. A solid-state polymer electrolyte membrane comprising:
    a mixture of a lithium salt, a plasticizer, and a co-network of a crosslinkable polyether addition, wherein the crosslinkable polyether addition is poly(ethylene glycol) diglycidyl ether (PEGDGE), poly(ethylene glycol) diacrylate (PEGDA), poly(ethylene glycol)dimethacry- late (PEGDMA), poly(propylene glycol) diacrylate (PPGDA), and poly(propylene glycol) dimethacrylate (PPGDMA), copolymers thereof, and mixtures thereof, and a crosslinkable amine addition, wherein the co-network is crosslinked, and the solid polymer electrolyte membrane is conductive on the order of $10^{-3}$ S cm$^{-1}$.

2. The solid-state polymer electrolyte membrane of claim 1, wherein the lithium salt is lithium bis-trifluoromethanesulfonylimide (LiTFSI), lithium bis-perfluoroethylsulfonylimide, lithium tetrafluoroborate, lithium perchlorate or mixtures thereof.

3. The solid-state polymer electrolyte membrane of claim 2, wherein the plasticizer is succinonitrile (SCN), glutaronitrile (GCN), adiponitrile, camphor, dialkylsebacate, alkyl stearate, or mixtures thereof.

4. The solid-state polymer electrolyte membrane of claim 3, wherein the crosslinkable amine addition is a polyether amine and wherein the polyether amine is either a polyether diamine or a polyether triamine.

5. The solid-state polymer electrolyte membrane of claim 4, further comprising a crosslinking agent, wherein the crosslinking agent is trimethylolpropane triacrylate (TMPTA), pentaerythritol triacrylate, trimethylolpropane ethoxylate triacrylate, trimethylolpropane propoxylate triacrylate, glycidyl methacrylate (GMA), or mixtures thereof.

6. The solid-state polymer electrolyte membrane of claim 1, wherein the plasticizer is glutaronitrile (GCN), adiponitrile, camphor, dialkylsebacate, alkyl stearate, or mixtures thereof.

7. The solid-state polymer electrolyte membrane of claim 1, wherein the crosslinkable polyether addition is poly(ethylene glycol) diglycidyl ether (PEGDGE), poly(ethylene glycol)dimethacrylate (PEGDMA), poly(propylene glycol) diacrylate (PPGDA), and poly(propylene glycol) dimethacrylate (PPGDMA), copolymers thereof, and mixtures thereof.

8. The solid-state polymer electrolyte membrane of claim 1, wherein the crosslinkable polyether addition is poly(ethylene glycol) diglycidyl ether (PEGDGE), and the crosslinkable amine addition is a polyether amine and wherein the polyether amine is either a polyether diamine or a polyether triamine.

9. A method of creating a lithium-ion battery comprising the steps of:
    a. providing an anode;
    b. providing a cathode;
    c. preparing a solid-state electrolyte polymer membrane comprising the steps of:
        i. mixing a lithium salt, a plasticizer, and a co-network of a crosslinkable polyether addition, wherein the crosslinkable polyether addition is poly(ethylene glycol) diglycidyl ether (PEGDGE), poly(ethylene glycol)diacrylate (PEGDA), poly(ethylene glycol) dimethacrylate (PEGDMA), poly(propylene glycol) diacrylate (PPGDA), and poly(propylene glycol) dimethacrylate (PPGDMA), copolymers thereof, and mixtures thereof, and a crosslinkable amine addition; and
        ii. crosslinking the mixture to form said solid-state electrolyte polymer membrane; and
    d. combining the anode, the cathode, and the solid-state electrolyte polymer membrane to create a lithium-ion battery.

10. The method of claim 9, wherein the anode is lithium metal, graphite, silicon, tin, germanium, or combinations thereof.

11. The method of claim 10, wherein the cathode is Lithium Iron Phosphate (LFP), Lithium Nickel Cobalt Manganese Oxide (NMC), Lithium Nickel Manganese Spinel (LMN) Lithium Nickel Cobalt Aluminum Oxide (NCA), Lithium Cobalt Oxide (LCO), Lithium Manganese Oxide (LMO), or combinations thereof.

12. The method of claim 11, wherein the lithium salt is lithium bis-trifluoromethanesulfonylimide (LiTFSI), lithium bis-perfluoroethylsulfonylimide, lithium tetrafluoroborate, lithium perchlorate or mixtures thereof.

13. The method of claim 12, wherein the plasticizer is succinonitrile (SCN), glutaronitrile (GCN), adiponitrile, camphor, dialkylsebacate, alkyl stearate, or mixtures thereof.

14. The method of claim 13, wherein the crosslinkable amine addition is a polyether amine and wherein the polyether amine is either a polyether diamine or a polyether triamine.

15. The method of claim 13, wherein the step of mixing further includes mixing in a crosslinking agent, wherein the crosslinking agent is trimethylolpropane triacrylate (TMPTA), pentaerythritol triacrylate, trimethylolpropane ethoxylate triacrylate, trimethylolpropane propoxylate triacrylate, glycidyl methacrylate (GMA), or mixtures thereof.

16. The method of claim 9, wherein the plasticizer is glutaronitrile (GCN), adiponitrile, camphor, dialkylsebacate, alkyl stearate, or mixtures thereof.

17. The method of claim 9, wherein the crosslinkable polyether addition is poly(ethylene glycol) diglycidyl ether (PEGDGE), poly(ethylene glycol)dimethacrylate (PEGDMA), poly(propylene glycol) diacrylate (PPGDA), and poly(propylene glycol) dimethacrylate (PPGDMA), copolymers thereof, and mixtures thereof.

18. The method of claim 9, wherein the crosslinkable polyether addition is poly(ethylene glycol) diglycidyl ether (PEGDGE), and the crosslinkable amine addition is a polyether amine and wherein the polyether amine is either a polyether diamine or a polyether triamine.

19. A method of creating a supercapacitive lithium-ion battery comprising the steps of:
    a. providing an anode;
    b. providing a cathode;
    c. preparing a solid-state electrolyte polymer membrane comprising the steps of:
        i. mixing a lithium salt, a plasticizer, and a co-network of a crosslinkable polyether addition and a crosslinkable amine addition; and
        ii. crosslinking the mixture to form said solid-state electrolyte polymer membrane;
    d. combining the anode, the cathode, and the solid-state electrolyte polymer membrane to create a lithium-ion battery; and
    e. lithiating the lithium-ion battery by deep discharging the lithium-ion battery, wherein deep discharging includes lowering the voltage to −0.5 V and then increasing the voltage to 0.5 V during a first cycle of the lithium-ion battery so as to form a supercapacitive lithium-ion battery, wherein the supercapacitive lithium-ion battery has an operating range of between about 0.01 and about 4.3 V without short-circuiting.

20. The method of claim 19, wherein the provided anode is a lithium metal, the provided cathode is Lithium Iron Phosphate (LFP), the lithium salt is lithium bis-trifluoromethanesulfonylimide (LiTFSI), the plasticizer is succinonitrile (SCN), the crosslinkable polyether addition is poly(ethylene glycol) diglycidyl ether (PEGDGE), and the crosslinkable amine addition is a polyether amine and wherein the polyether amine is either a polyether diamine or a polyether triamine.

* * * * *